Feb. 3, 1931. E. T. ADAMS 1,790,892
INTERNAL COMBUSTION ENGINE
Filed Oct. 26, 1920
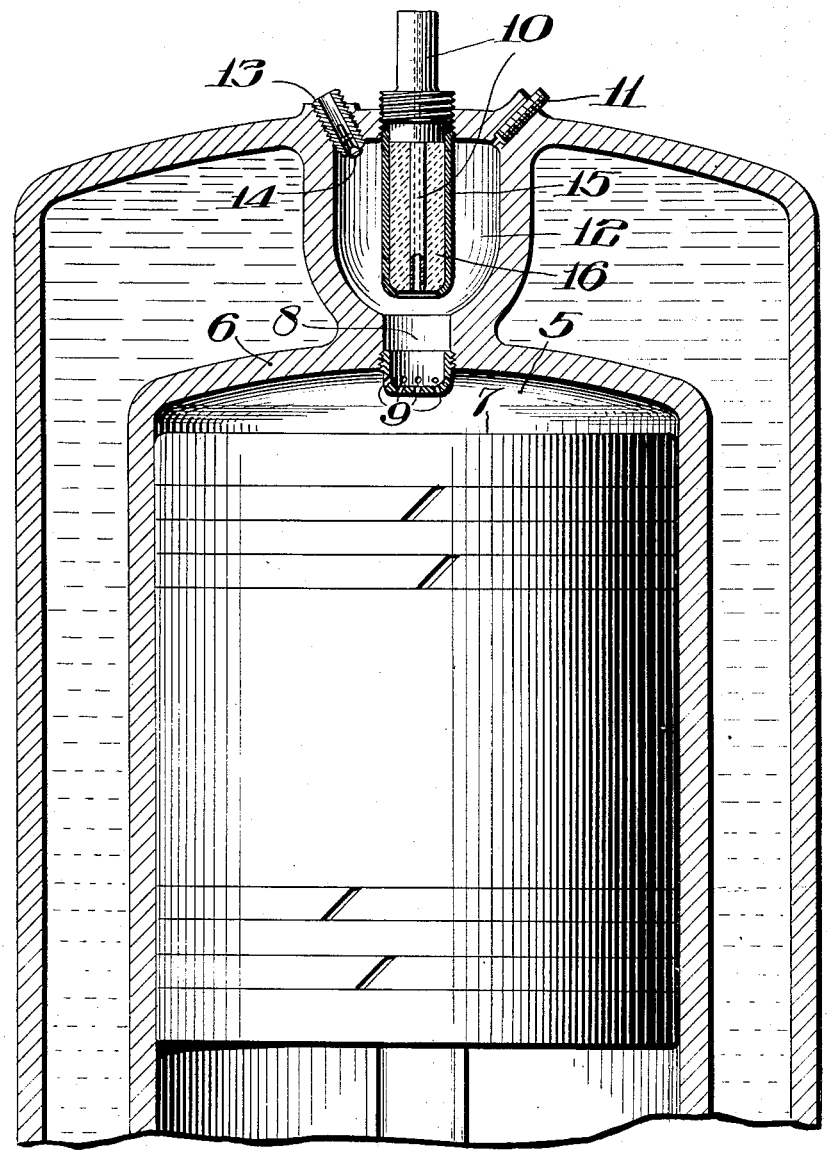
INVENTOR
Edward T. Adams,
BY
HIS ATTORNEY Patented Feb. 3, 1931

1,790,892

UNITED STATES PATENT OFFICE

EDWARD T. ADAMS, OF PHOENIX, ARIZONA, ASSIGNOR TO FAIRBANKS, MORSE & CO., OF CHICAGO, ILLINOIS, A CORPORATION OF ILLINOIS

INTERNAL-COMBUSTION ENGINE

Application filed October 26, 1920. Serial No. 419,698.

The invention relates to improvements in internal combustion engines, designed to burn oil fuels, especially the heavier grades of mineral oil, tar oils and the like.

The object of the invention is to provide new and efficient method and means for insuring proper combustion of such fuels within the engine cylinder.

The invention comprises two combustion spaces; a main combustion space within the power cylinder, the clearance and an auxiliary preliminary combustion space delivering thereto.

There are two fuel oil or fluid combustible injections, one delivering to the preliminary combustion chamber at a point remote from the clearance and arranged and proportioned to produce a clean burning mixture therein; the other, the main injection or spray, delivers into the preliminary chamber toward a passage leading to the main combustion space within the power cylinder. The main injection or spray is within the preliminary chamber and into the path of travel of the discharge from the preliminary combustion chamber. In other words the discharge from the main injection or spray is toward a passage delivering into the main combustion space or clearance of the power cylinder, and the discharge from the preliminary combustion chamber is into the same passage.

The result of this arrangement, and the method of operation, is that the blast of combustible mixture which is projected from the preliminary combustion chamber, through the passage delivering to the main combustion space or clearance of the power cylinder, acts upon the oil, delivered from the main injection or spray, to atomize and drive the same partly ignited into the main combustion space.

Referring to the drawing, which illustrates, merely by way of example, suitable means for effecting my invention:—

The figure is a section through a cylinder head showing means for effecting my invention.

The main combustion space or clearance 5, is between the end of the power cylinler 6 and the end of the piston 7. The passage 8 delivers through the apertures or ports 9 into the main combustion space or clearance 5. The main injection or spray 10 delivers into the preliminary combustion chamber 12 toward and near the passage 8. The auxiliary injection or spray 11 delivers into the preliminary combustion chamber 12, at a point remote from passage 8.

The inlet 13 for scavenging air, is provided with the non-return valve 14; the heater or hot element 15 is shown as convenient means for igniting the mixture in chamber 12, and a liner 16 of heat insulating material is interposed between the hot element 15 and the main injection tube 10.

In order to secure the maximum effect or efficiency, the passage 8 is so proportioned and positioned, that the main fuel spray discharging into chamber 12 close to and directed toward the passage 8, will practically all accumulate in said passage. This fuel being in the form of a mixture too rich to burn.

The volume of the preliminary combustion chamber 12, and the quantity of fuel delivered thereto at 11, are proportioned to produce certain and clean burning within the chamber. This results in the generation of excess pressure which will act upon the fuel accumulated in passage 8 and will cause a discharge of the fuel therefrom into the main clearance and a thorough mixing of the same with the air in said clearance 5. It is obvious that the threaded liner in the passage 8 between the preliminary combustion chamber and the main combustion chamber may be of varied form or thickness and in the number of ports, or it may be omitted altogether. Chamber 12 serves in the nature of a superheater and injector to such main fuel injection, which becomes increasingly important with the lowering of the grade of fuel used.

By the method and means described, a heavy refractory fuel may be used in the main injection or spray, and a lighter or more volatile auxiliary fuel may be used in the preliminary combustion chamber, either permanently or when starting up.

The quantity of fuel delivered to the preliminary combustion chamber 12 may be wholly independent of the load on the engine, or sufficiently so, as to insure clear burning at all loads, and the certainty of generation within the said preliminary chamber of a pressure and temperature higher than that within the cylinder proper. As shown in the figure the preliminary combustion chamber is approximately one-third the volume of the main combustion chamber or clearance. In operation, a blast of burning, flaming mixture is violently projected from the preliminary combustion chamber 12, through the passage 8, into the main combustion space or clearance 5. The fuel collected or accumulated in said passage 8 is brought into intimate contact with this burning mixture discharging from chamber 12.

If the auxiliary or preliminary injection is timed to occur ahead of the main injection, the main spray or stream of fuel from 10, is delivered into passage 8 into a flame produced by the burning product issuing from the preliminary chamber 12.

If the main injection occurs first, and the passage 8 is properly proportioned, the main fuel supply, as a mass of oil and oil spray and vapor, concentrated in passage 8, will be superheated and violently driven, that is, with turbulence, out of this passage into the main combustion space or clearance 5, where it will be intimately mixed with the air previously compressed within said space 5, and burned.

Or again, if the main and auxiliary injections be timed together, all of the above actions may be considered as occurring at once.

In the larger size engines, and especially in engines using a very heavy fuel, the preferred construction is with two fuel-injection valves, as such arrangement gives complete control of the timing and the choice of fuel of one valve independent of the other.

Such complete separation may not however, be necessary to successful operation, and, using the lighter oils, we may use a single valve with two orifices, or a single valve which is so placed that its main discharge is to the main cylinder, and only an amount, proportional to the volume of the auxiliary or preliminary combustion chamber, is diverted to that chamber, which may be caused by the location of the single injection valve and the form and location of the preliminary combustion chamber. Where I use a single valve its main discharge will be directed toward the passage and the ascending piston will force some of this fuel into more remote portions of the preliminary combustion chamber and mit it with such a quantity of air as to make it more readily combustible than the remaining main body of the fuel.

Whatever may be the construction or arrangement, it is important to avoid an over-rich mixture in the preliminary combustion chamber, which would result in a chamber filled with carbon.

As above stated, the mixture must be a clear burning mixture.

What I claim is:—

1. In an internal combustion engine, the combination of means forming a substantially central preliminary combustion chamber and a combustion clearance, said chamber and said clearance being substantially symmetrical with respect to a common axis; a short narrow passage between said chamber and said clearance and substantially coaxial therewith; means comprising a cooling fluid jacket of uniform diameter about said preliminary chamber and said clearance limiting the temperature of the walls of said chamber, clearance and passage; said engine clearance being between a plane end piston and the cylinder head and characterized by a substantially constant diminution in the space between the cylinder head and piston face from the center to the sides; and of substantially three times the volume of said preliminary combustion chamber; an auxiliary injection device for spraying fuel into said preliminary chamber, said chamber also provided with a scavenging air inlet; a central injection device at the outer end of said preliminary combustion chamber, heating means surrounding and spaced from said injection device, said injection device adapted to spray the fuel toward the narrow passage whereby a portion of said fuel that is so mixed with air as to be readily combustible will burn and unburned fuel will be forced into the clearance to be mixed with the air and ignited therein.

2. In an internal combustion engine of high-compression type, adapted for heavy fuels, the combination of means forming a substantially central preliminary combustion chamber and a combustion clearance, said chamber and said clearance being substantially symmetrical with respect to a common axis; a short narrow passage between said chamber and said clearance and substantially coaxial therewith; means comprising a cooling fluid jacket of uniform diameter about said preliminary chamber and said clearance limiting the temperature of said chamber, clearance and passage, said engine clearance being between a plane end piston and the cylinder head, and volumetrically so related to the preliminary chamber as to provide a working compression, and uniform burning, throughout the clearance, a central injection device at the other end of said preliminary combustion chamber having a heating means surrounding and spaced from the same, said injection device adapted to spray the fuel toward said narrow passage whereby a portion of said fuel that is so mixed with air as to be readily combustible will burn, and unburned fuel will be forced into the clearance to be mixed with the air and ignited therein.

EDWARD T. ADAMS.